United States Patent [19]

Dietz et al.

[11] Patent Number: 4,986,852
[45] Date of Patent: Jan. 22, 1991

[54] PIGMENTS AND USE THEREOF

[75] Inventors: Erwin Dietz, Kelkheim; Gustav Kapaun, Bad Soden am Taunus; Michael Kappert, Kelkheim; Frank Prokschy, Frankfurt am Main; Adolf Kroh, Selters; Manfred Urban, Wiesbaden, all of Fed. Rep. of Germany

[73] Assignee: Hoechst Aktiengesellschaft, Frankfurt am Main, Fed. Rep. of Germany

[21] Appl. No.: 286,894

[22] Filed: Dec. 20, 1988

[30] Foreign Application Priority Data

Dec. 22, 1987 [DE] Fed. Rep. of Germany ....... 3743619
Nov. 17, 1988 [DE] Fed. Rep. of Germany ....... 3838814

[51] Int. Cl.$^5$ .......................... C08K 5/04; C08K 5/16; C08K 5/34; C08K 5/36
[52] U.S. Cl. ................................... 106/498; 106/493; 106/494; 106/497; 540/127; 544/99; 546/32; 546/36; 546/58; 548/336; 549/232
[58] Field of Search ............... 106/493, 494, 497, 498; 544/99; 546/32, 36, 58; 548/336; 549/232; 540/127

[56] References Cited

U.S. PATENT DOCUMENTS

| | | | |
|---|---|---|---|
| 4,256,507 | 3/1981 | Kranz et al. | 106/494 |
| 4,310,359 | 1/1982 | Ehashi et al. | 106/495 |
| 4,451,398 | 5/1984 | Patsh et al. | 8/657 |
| 4,720,304 | 1/1988 | Ruff et al. | 106/494 |

FOREIGN PATENT DOCUMENTS

| | | |
|---|---|---|
| 3106906 | 1/1982 | Fed. Rep. of Germany . |
| 58-145762 | 8/1983 | Japan . |
| 58-225159 | 12/1983 | Japan . |
| 58-225160 | 12/1983 | Japan . |

OTHER PUBLICATIONS

Derwent Abstract of JP 58-145762 (1983).
Derwent Abstract of JP 58-225159 (1983).
Derwent Abstract of JP 58-225160 (1983).

*Primary Examiner*—Paul Lieberman
*Assistant Examiner*—Christine A. Skane

[57] ABSTRACT

Pigments of the formula I

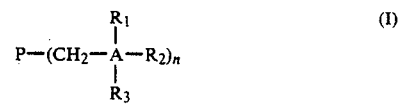

where A is a five- or six-membered aromatic fused or unfused heterocycle which contains one to three hetero atoms from the series consisting of nitrogen and/or oxygen and/or sulfur and which is bonded to the methylene group via a carbon atom, $R_1$ and $R_2$ are each hydrogen, alkyl $C_1$–$C_4$, alkylene $C_2$ or aryl, and together $R_1$ and $R_2$ may also be an aliphatic or aromatic ring, $R_3$ is hydrogen, alkyl $C_1$–$C_4$, hydroxylkyl $C_1$–$C_3$ or alkylene $C_2$, P is the radical of a polycyclic pigment or a radical of a mix-crystal of polycyclic pigments, and n is a number from 0.0001 to 0.2, are useful for pigmenting high molecular weight materials in the form of plastic materials, melts, spinning solutions, surface coatings, paints, printing inks, baking finishes of the class of the alkyd melamine resin or acrylic melamine resin finishes, two-component coatings based on polyisocyanate-crosslinkable acrylic resins and printing inks based on nitrocellulose.

5 Claims, No Drawings

PIGMENTS AND USE THEREOF

The present invention relates to novel pigments having improved flocculation stabilities and rheological properties and to the use thereof for pigmenting high molecular weight materials.

A large number of problems can arise with the dispersing of pigments in high molecular weight materials. In the case of strongly agglomerating and difficult-to-disperse pigments, dispersing is incomplete, and the best fineness and color strength are not obtained.

Incompletely dispersed agglomerates and also large particles can interfere with further processing; more particularly, they can lead to sedimentation problems in low-viscosity systems (surface coatings and printing inks). Furthermore, flocculation in the course of dispersing, storage or further processing can lead to undesirable rheological changes of the system and to surface flaws on and color strength and gloss losses from the applied film.

DE Offenlegungsschrift No. 3,106,906 and JP No. 58/145,762, JP No. 58/225,159 and JP No. 58/225,160 disclose pigment compositions which show improved flocculation stability and more favorable rheological properties in paint systems. The pigment derivatives used for this purpose, however, must be prepared in a multistage process. The procedure described therein leads in several cases to unsatisfactory yields and results and is not applicable with some classes of pigment. In addition, the compounds mentioned there have other structures in that aliphatic amines, and not aromatic amines, are used in their preparation. The methylene groups are linked for example at one end via CO and $SO_2$ groups and at the other end to the nitrogen on the aliphatic amine.

In contradistinction therefrom, the methylene group in the pigments according to the invention is bonded at one end directly to the color-conferring pigment radical. Furthermore, in the aforementioned Japanese Preliminary Published Applications, pigments are combined with chemically unrelated pigment derivatives.

It is an object of the present invention to provide pigments having improved flocculation stability and rheological properties and suitability for coloring high molecular weight materials.

The present invention accordingly provides novel pigments of the general formula I

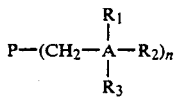

where A is a five- or six-membered aromatic fused or unfused heterocycle which contains one to three hetero atoms from the series consisting of nitrogen and/or oxygen and/or sulfur and which is bonded to the methylene group via a carbon atom, $R_1$ and $R_2$ are each hydrogen, alkyl $C_1$–$C_4$, alkylene $C_2$ or aryl, for example phenyl, and together $R_1$ and $R_2$ may also be an aliphatic or aromatic ring, for example a benzene ring, $R_3$ is hydrogen, alkyl $C_1$–$C_4$, hydroxyalkyl $C_1$–$C_3$ or alkylene $C_2$ with alkyl being linear or branched, P is the radical of a polycyclic pigment and n is a number from 0.001 to 0.2.

A polycyclic pigment radical P is preferably an anthraquinone, anthrapyrimidine, anthanthrone, quinacridone, quinophthalone, diketopyrrolopyrrole, dioxazine, flavanthrone, indanthrone, isoindoline, isoindolinone, isoviolanthrone, perinone, perylene, phthalocyanine, pyranthrone or thioindigo radical. P may also be the radical of a mix-crystal of polycyclic pigments, in particular from the group of the aforementioned pigment classes.

A five-membered aromatic heterocycle A is preferably furan, thiophene, pyrrole, pyrazole, a thiazole, an oxazole, a triazole or in particular imidazole.

Preferred fused heterocycles are thionaphthene, benzoxazole, benzothiazole, benzimidazole, benzotriazole and in particular indole. While n in the abovementioned formula (I) is in general 0.001 to 0.2, preferred pigments are those where n is 0.01 to 0.1 and particularly preferred pigments are those in which n is 0.02 to 0.08.

The best value for n depends on the chemical structure, on the crystal and surface properties of the pigment and on the properties of the application medium and must be determined empirically case by case for every combination of pigment and application medium. Excessively low or excessively high values of n do not lead to the best possible pigment properties.

In what follows, the term "pigment" is to be understood as meaning a product of the abovementioned formula (I) where n is $\leq 0.2$ and the term "pigment derivative" is to be understood as meaning a product of the formula (I) where n is $> 0.2$.

The pigment derivatives of the aforementioned general formula (I) substituted by aromatic fused or unfused methylene heterocycles can be prepared as follows:

They can be prepared in a conventional manner either from hydroxymethyl heterocycles or from heterocycles in the presence of formaldehyde-donating substances, for example paraformaldehyde or trioxane, in an acid reaction medium, for example sulfuric acid, oleum or polyphosphoric acid, in the presence of the pigments mentioned, it being advantageous to choose an acid in which the particular pigment is soluble.

If concentrated sulfuric acid or oleum is used as the condensation medium it is possible for sulfonic acid groups to become incorporated to a minor extent. In the case of heterocycles which contain more than one hydroxymethyl group or if an excess of formaldehyde is present, it is possible for the hydroxymethyl groups on a heterocycle to react more than once with pigment radicals.

It is also possible to introduce the methylene heterocycle as a substituent into a pigment intermediate and then to prepare the pigment according to the invention therefrom.

The degree of substitution n of the polycylic pigment P can be obtained by direct means. It is also possible, however, to prepare a pigment derivative of the formula I and standardize it in a further step to the final degree of substitution n. This standardization to the degree of substitution n can be effected in a subsequent step (fine division, conditioning, wet or dry grinding, final mixing).

The standardization to the degree of substitution n as part of a fine division step can be effected before or after a fine division process or during a fine division process. A state of fine division can be brought about by means of a mechanical process, for example wet or dry grinding, or by means of a chemical process, for example dissolving in strong acids or alkalis and subsequently precipitating or revatting.

The final standardization can also be effected in a conditioning process in an aqueous and/or solvent-containing system. The pigment derivative of the formula I can be added in the form of the free base or in the form of a salt, for example in dissolved form in suitable solvents, with suitable control of the pH.

Preference is given to the isolation of the pigment in a weakly alkaline medium at a pH of about 8 to about 11.

The final standardization can also be effected by dry mixing, for example in a mill.

To obtain optimum properties for the pigments in the final composition, they must be subjected in a process to intensive mechanical stress (impact, collison or shear stress). This treatment can take place in the course of the fine division step, in the course of conditioning or in the course of dispersion in the application medium, the decisive properties not being finally imparted until this mechanical treatment.

The pigments according to the invention are suitable in particular for pigmenting high molecular weight organic materials. High molecular weight organic materials which can be pigmented with the products of the abovementioned formula I are for example cellulose ethers and cellulose esters, such as ethylcellulose, nitrocellulose, cellulose acetate or cellulose butyrate, natural resins or synthetic resins, such as polymerization resins or condensation resins, for example amino resins, in particular urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicon resins, solo or mixed.

It is immaterial here whether the high molecular weight organic compounds mentioned are present as plastic materials, melts or in the form of spinning solutions, surface coatings, paints or printing inks. Depending on the intended use, it has proved advantageous to use the pigments according to the invention in the form of toners or in the form of preparations or dispersions. Based on the high molecular weight organic material to be pigmented, the compounds of the abovementioned formula I are used in an amount of preferably 0.1 to 10% by weight.

Particularly preferred surface coating systems are baking finishes of the class of the alkyd melamine resin or acrylic melamine resin finishes and two-component finishes based on polyisocyanate-crosslinkable acrylic resins. Of the large number of printing inks, printing inks based on nitrocellulose deserve a particular mention.

The pigments according to the invention are easily dispersible in many application media in a very finely divided form.

These dispersions are possessed of a high flocculation stability and have excellent rheological properties even in the case of high pigmentation. They can be used to produce surface coatings and prints of high color strength, high gloss and high transparency with excellent fastness properties.

Unlike the imidazolyl-containing dyes described in EP No. 0,034,725, which are soluble in water or organic acids, the pigments according to the invention are compounds which are insoluble in such media, which are present in a single phase and which do not even dissolve in customary organic solvents, and thus have excellent fastness properties. To test the properties, an alkyd melamine resin varnish (AM) based on a medium-oil, non-drying alkyd resin prepared from synthetic fatty acids and phthalic anhydride and a butanol-etherified melamine resin and portions of a non-drying alkyd resin based on ricinic acid (short-oil) and an acrylic resin baking finish based on a nonaqueous dispersion (TSA-NAD) were selected from the large number of existing systems.

The rheology of the mill base following dispersion is assessed on the following five-step scale:

| 5 | highly fluid | 2 | slightly set |
| 4 | fluid        | 1 | set |
| 3 | ropy         |   |     |

To further characterize the mill base, flow curves were recorded for some examples in a Rotavisko RV 3 rotary viscometer from Haake.

After the mill base has been diluted to the final pigment concentration, the viscosity can be assessed using a Rossmann type 301 Viskospatel from Erichsen.

Gloss measurements are carried out at an angle of 20° in accordance with DIN 67530 (ASTMD 523) using a "multigloss" glossmeter from Byk-Mallinckrodt.

In the examples which follows, parts are by weight.

EXAMPLE 1

Preparation 20.6 parts of C. I. Pigment Orange 43, 71105 (perinone), are added at 0° C. to 250 parts of sulfuric acid monohydrate. 3.7 parts of 4-methyl-5-hydroxymethylimidazole hydrochloride are then added a little at a time. The reaction solution is subsequently stirred at 105° C. for 4 hours and then, after cooling down, discharged onto water and ice. The mixture is adjusted to pH 10 with sodium hydroxide solution. The precipitated product is filtered off with suction, wshed until salt-free and dried to leave 22.6 parts of the product of the formula

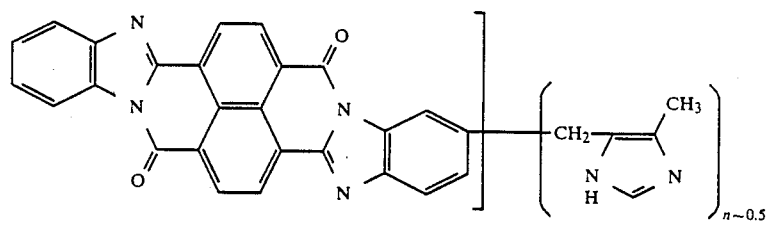

The above formula is derived from the H¹-NMR spectrum in $D_2SO_4$ from the position and intensities of the aliphatic and aromatic protons. 9.5 parts of C. I. Pigment Orange 43 and 0.5 part of the compound of the above formula are ground together.

In this way the compound of the above formula is obtained with n~0.025.

Application

A commercially available AM varnish is pigmented in 12% strength with the compound of the above formula. Following dispersion with glass beads 3 mm in diameter for 45 minutes, the rheology of the mill base is assessed as 4, while a mill base prepared in the same way with the unsubstituted pigment has a rheology rating of 1.

The masstone varnish with a 4% pigment concentration has a viscosity of 3.6 sec compared with the 6.2 sec of the unsubstituted pigment. The masstone varnish is standardized by the addition of a 1:1 n-butanol/xylene mixture to a viscosity which corresponds to an efflux time in the Ford cup (nozzle 4 mm in diameter) of 22 seconds. Thereafter the varnish is cast onto a foil and baked after solvent flashoff at 140° C. for 30 minutes. The gloss value is 86 compared with 42 of the unsubstituted pigment.

Rubout Test

The masstone varnish is diluted in such a way with 25% strength white varnish that the ratio of colored to white pigment is 1:10.

After a stirring time of 3 minutes the test medium is cast with a film-forming apparatus onto white art board. To test the flocculation stability, a portion of the film, after a brief drying period, is rubbed out with a brush or with a finger. If flocculation took place in the course of stirring, then the flocculated pigment is at least partially deagglomerated by the shear forces exerted on the film. The rubbed-out area then has a deeper color than the area which has not been aftertreated.

In the case of the pigment according to the invention, no flocculation took place, while with the unsubstituted pigment there are strong signs of flocculation.

EXAMPLE 2

Preparation 60 parts of a moist filtercake of C. I. Pigment Orange 43, 71105 (perinone) (≃20 parts of dry product) are heated together with 9.8 parts of a moist filtercake of the compound of the formula mentioned in Example 1 (≃0.8 part of dry product) and 327 parts of isobutanol at 90° C. for 3 hours, and the mixture is then brought to pH 9 with sodium hydroxide solution. After the isobutanol has been removed by distillation, the distillation residue is filtered with suction, and the filtercake is washed neutral and dried at 60° C. to leave 20.1 parts of a product of the formula mentioned in Example 1 with n ~0.02.

Application

If the product is tested as described in Example 1, the following values are obtained:

|  | Example 2 | Comparison |
| --- | --- | --- |
| Rheology | 5 | 1 |
| Gloss | 86 | 42 |

The two coats show satisfactory overpaintability. The two pigments are insoluble in dilute acetic acid. In contrast, products where n is 1 or 2 are readily soluble in dilute acetic acid.

EXAMPLE 3

Preparation and Application

A mix-crystal consisting of 8.7 parts of C. I. Pigment Red 194, 71100 (perinone), 1.0 part of C. I. PIgment Orange 43 (perinone) and 0.3 part of the compound of the formula mentioned in Example 1 are ground. The result obtained is a product of the formula

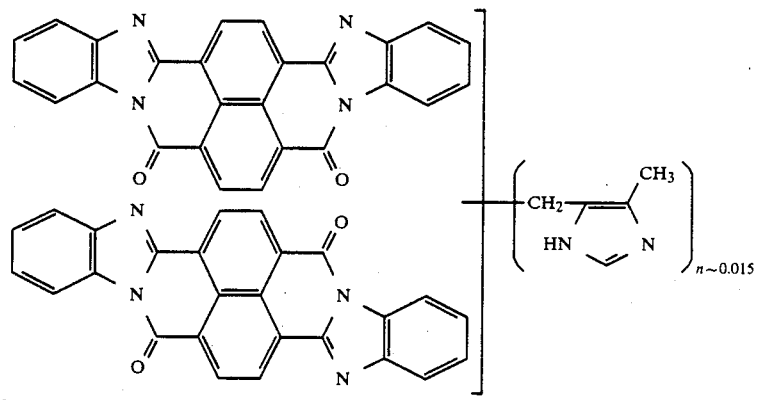

On testing in an 8% strength pigmentation in the AM varnish, the following results are obtained:

|  | Example 3 | Comparison |
| --- | --- | --- |
| Viscosity | 3.6 sec | 5.8 sec |
| Gloss | 80 | 40 |

The coats are more transparent and stronger in color than the comparison.

EXAMPLE 4

Preparation

Reaction of 28.6 parts of diketopyrrolopyrrole with 13.4 parts of 4-methyl-5-hydroxymethylimidazol hydrochloride in sulfuric acid monohydrate gives the compound of the formula

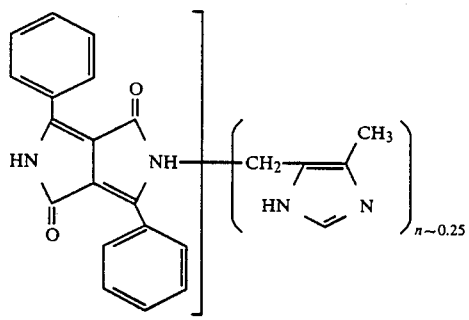

9.5 parts of diketopyrrolopyrrole pigment and 0.5 part of the compound of the above formula are ground.

In this way the compound of the above formula is obtained with n~0.013.

On testing in a 5% strength pigmentation in the AM varnish the coats obtained are more transparent and stronger in color than those obtained with the unsubstituted pigment.

|  | Example 4 | Comparison |
| --- | --- | --- |
| Rheology | 5 | 2 |
| Gloss | 86 | 27 |

EXAMPLE 5

50 parts of perylene-3,4,9,10-tetracarboxylic dianhydride in the form of a moist presscake are suspended in 1,441 parts of water. Thereafter 27.6 parts of a moist presscake (corresponding to 5 parts dry) of the compound of the formula

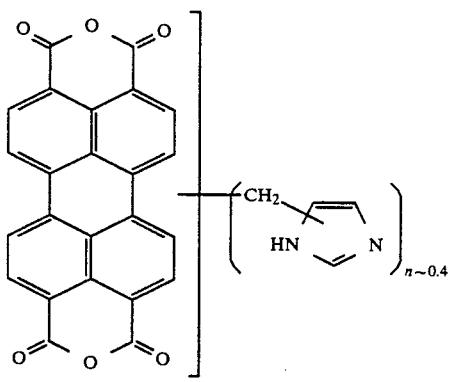

are added, this compound having been prepared by reacting perylene-3,4,9,10-tetracarboxylic anhydride with paraformaldehyde and imidazole in H$_2$SO$_4$. 15 parts of a 50% strength commercially available resin soap are then added, and the mixture is cooled down to 0° to 5° C. 158.8 parts of a 31.9% strength monomethylamine solution are then added dropwise at that temperature in the course of 10 minutes. The mixture is subsequently stirred at 0° to 5° C. for 15 minutes, and a solution of 28.5 parts of anhydrous calcium chloride and 94.5 parts of water is then added dropwise in the course of 15 minutes. Stirring is continued at 0° to 5° C. for 1 hour. The temperature is then raised to 80° C. and maintained at that level for 2 hours with stirring. The mixture is then filtered with suction at 50° C., and the filter residue is washed until neutral and chloride-free and dried at 80° C. to leave 66 parts of the compound of the aforementioned formula with n=0.04, which gives darker colorings in the AM varnish than the unsubstituted pigment. The rheology is 5 as against 1.

EXAMPLE 6

50 parts of perylene-3,4,9,10-tetracarboxylic dianhydride in the form of a moist presscake are suspended in 1,441 parts of water. Thereafter 34.5 parts of a presscake (corresponding to 5 parts dry) of the compound of the formula

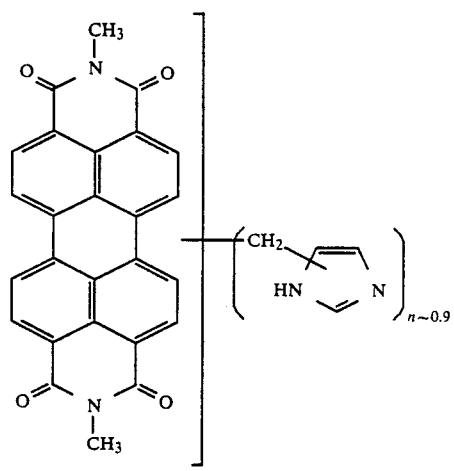

are added, the compound having been prepared by reacting N,N'-dimethylperylene-3,4,9,10-tetracarboximide with paraformaldehyde and imidazole in H$_2$SO$_4$.

Thereafter 15 parts of a 50% strength commercially available resin soap are added, and the mixture is cooled down to 0° to 5° C. 158.8 parts of a 31.9% strength monomethylamine solution are then added dropwise at that temperature in the course of 10 minutes. The mixture is subsequently stirred at 0° to 5° C. for 15 minutes, and a solution of 28.5 parts of anhydrous calcium chloride and 94.5 parts of water is then added dropwise in the course of 15 minutes. Stirring is continued at 0° to 5° C. for 1 hour. The temperature is then raised at 80° C. and maintained at that level for 2 hours. The mixture is then filtered with suction at 50° C., and the filter residue is washed until neutral and chloride-free and dried at 80° C.

The result obtained is 62.3 parts of the compound of the above formula with n~0.08, which gives darker colorings in the TSA-NAD finish than the unsubstituted pigment. The rheology is 5 as against 1.

EXAMPLE 7

9 parts of Pigment Red 179 are mixed with 1 part of the compound of the idealized formula

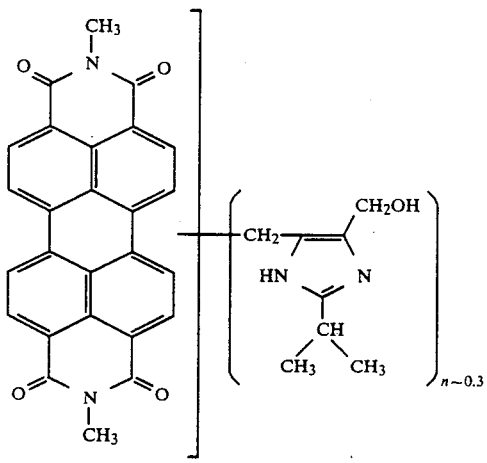

prepared by reacting N,N'-dimethylperylene-3,4,9,10-tetracarboximide with 2-isopropyl-4,5-dihydroxymethylimidazole, in a laboratory mill.

The result obtained is the compound of the above formula with n~0.03, which gives a darker shade in the TSA-NAD finish than the comparison. The rheology is 5 as against 1.

EXAMPLE 8

Preparation 4.4 parts of copper phthalocyanine are added at room temperature to 200 parts of sulfuric acid monohydrate.

3.4 parts of 5-hydroxymethyl-4-methylimidazole hydrochloride are then stirred in at 0° C. a little at a time. Stirring is continued at 30° to 35° C. for 1 hour and then at 100° C. for 24 hours. After cooling down the mixture is discharged onto ice and water and filtered with suction. The filtercake is slurried in water, and the slurry is adjusted to pH 10 with sodium hydroxide solution. The slurry is filtered with suction, and the filter residue is washed until neutral and salt-free and dried.

The result obtained is 16 parts of the product of the formula

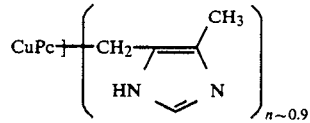

8.0 parts of C. I. Pigment blue 15:1 and 2.0 parts of the compounds of the above formula are ground in a laboratory mill. The result obtained is a compound of the above formula with n~0.18.

On testing in a 5% strength pigmentation in the AM varnish the following results are obtained:

|  | Example 8 | Comparison |
| --- | --- | --- |
| Vioscosity | 4.1 sec | 23.5 sec |
| Gloss | 74 | 23 |

EXAMPLE 9

8.0 parts of C. I. Pigment Blue 15:3 and 2.0 parts of the compound of the formula in Preparation Example 8 are ground in a laboratory mill. The result obtained is a compound of the formula

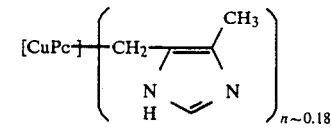

On testing in a 15% strength pigmentation in the AM varnish the following results were obtained:

|  | Example | Comparison |
| --- | --- | --- |
| Rheology (15% strength pigmentation) | 5 | 1 to 2 |
| Viscosity (5% strength pigmentation) | 3.2 sec | 6.1 sec |
| Gloss | 86 | 30 |

EXAMPLE 10

Preparation 17.4 parts of 2,5-diphenylaminoterephthalic acid are added to 157 parts of polyphosphoric acid (83.5% of $P_2O_5$) at 80° C. in the course of 1 hour, and the mixture is stirred for 30 minutes. 3.7 parts of 2-methylimidazole are then added in the course of 20 minutes, and the mixture is subsequently stirred for 20 minutes. 2.1 parts of p-formaldehyde are then added, and the mixture is stirred at 80° to 85° C. for 3 hours.

Thereafter the mixture is heated to 120° to 125° C. in the course of 30 minutes and subsequently stirred at that temperature for 2 hours. Thereafter the solution is discharged onto ice and water for hydrolysis, and the product is filtered off with suction and washed until neutral.

The result obtained in a moist form is a compound of the formula

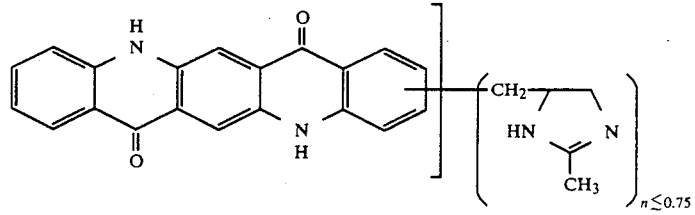

183.3 parts of a moist crude quinacridone (24% strength), obtained by cyclization of 2,5-di(4'-methylphenylamino)-terephthalic acid in polyphosphoric acid, hydrolysis in water and filtration, are suspended in 270 parts of isobutanol, 5 g of 33% strength NaOH are added, and the mixture is stirred at 125° C. for 3 hours. The mixture is then cooled down to 60° C., and 10.2 parts of a 34.5% strength aqueous paste of a pigment derivative of the abovementioned formula are added. Thereafter the isobutanol is distilled off with steam in the course of 2 hours while stirrring, and the pigment is isolated by filtration, washed until neutral and dried.

The result obtained is a magenta pigment of the formula

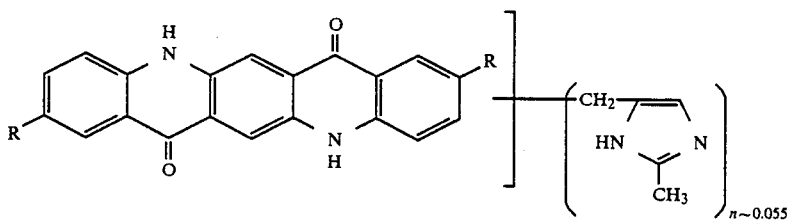

Incorporation in the AM varnish and the TSA-NAD finish gives transparent masstone coatings having a bright shade.

|  | Example 10 | Comparison |
|---|---|---|
| AM varnish |  |  |
| Rheology | 5 | 1 to 2 |
| Viscosity | 3.4 sec | 6.2 sec |
| Gloss | 92 | 40 |
| TSA-NAD |  |  |
| Rheology | 5 | 1 to 2 |
| Viscosity | 3.8 sec | 6.8 sec |
| Gloss | 84 | 10 |

EXAMPLE 11

If instead of the 2,9-dimethylquinacridone used in Example 10 the same amount of a quinacridone mixcrystal of 3 parts of 2,9-dimethylquinacridone and 1 part of quinacridone is used as crude quinacridone and otherwise the procedure of Example 10 is followed, the result obtained is a magenta pigment of the formula shown in Example 10 with n ~0.055, which gives highly transparent coats from AM varnish.

|  | Example 11 | Comparison |
|---|---|---|
| Rheology | 5 | 1 to 2 |
| Viscosity | 2.9 sec | 4.9 sec |
| Gloss | 97 | 48 |

EXAMPLE 12

To 500 parts of an 8.8% strength aqueous pigment suspension of the high-hiding γ-modification of unsubstituted linear quinacridone are added at 50° to 60° C. with stirring 26.4 parts of an aqueous 13.3% strength suspension of a condensation product of 1 mole of unsubstituted quinacridone and 0.95 mole of 4-methyl-5-hydroxymethylimidazole, prepared by condensation in H₂SO₄, of the formula

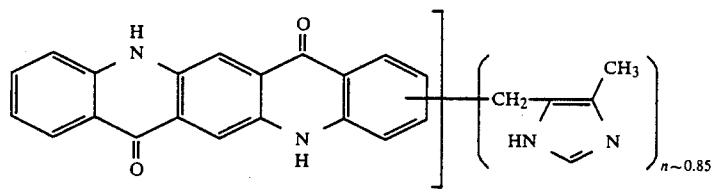

and the mixture is stirred for 2 hours. Thereafter the pigment is filtered off and dried.

The result obtained is a compound of the above formula with n ~0.063. The bluish red pigment prepared in this manner gives stronger and somewhat bluer coats from AM varnish than the comparison.

|  | Example 12 | Comparison |
|---|---|---|
| Rheology | 5 | 3 to 4 |
| Viscosity | 2 sec | 2.4 sec |
| Gloss | 93 | 20 |

EXAMPLE 13

27.84 parts of a condensation product of 1 mole of 2,9-dimethylquinacridone, 0.9 mole of 2-methylimidazole and p-formaldehyde, prepared in concentrated hydrochloric acid at 50° to 70° C., of the formula

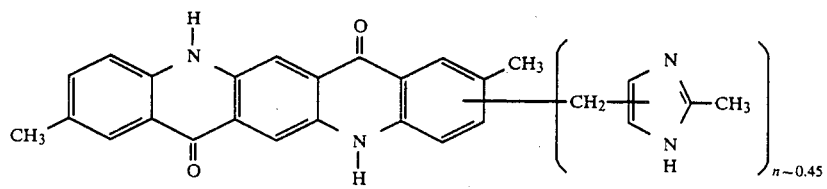

are added in the form of an 8% strength aqueous suspension at 70° to 80° C. to 3,000 parts of a suspension containing 348 parts of pigmentary 2,9-dimethylquinacridone and 15 g of NaOH. After stirring for 1 hour the pigment is isolated by filtration, washed until neutral and dried.

The result obtained is a compound of the above formula with n~0 035.

The magenta pigment shows better rheological and coloristic behavior in the AM varnish than the unsubstituted product.

|  | Example 13 | Comparison |
|---|---|---|
| Rheology | 5 | 1 to 2 |
| Viscosity | 2.9 sec | 6.2 sec |
| Gloss | 94 | 40 |

EXAMPLE 14

20 parts of crude C. I. Pigment Violet 23 salt-free) are added at 120° C. to 500 parts of polyphosphoric acid. After stirring for 1 hour 3 parts of 2-hydroxymethylpyrrole are slowly added. This is followed by stirring at 120° C. for 5 hours. The reaction solution is then discharged onto ice-water, and the mixture is brought to pH 10 with concentrated sodium hydroxide solution and left to stand overnight. Thereafter the precipitate is filtered off with suction, washed with water until neutral and salt-free and dried at 50° C. The result obtained is 21.8 parts of the pigment derivative of the formula

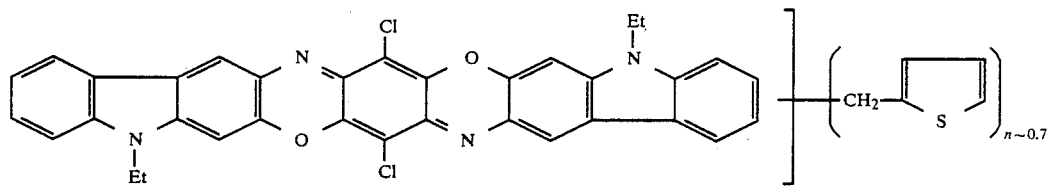

180 parts of the salt-containing product obtained in about 80% strength by reacting tetrachloro-p-benzoquinone with 2 moles of 3-amino-9-ethylcarbazole to give 2,5-di-(9-ethylcarbazol-3-ylamino)-3,6-dichloro-1,4-benzoquinone and a subsequent cyclization to crude C. I. Pigment Violet 23 of C. I. 51319 (cf. "Venkataraman" Volume II (1952), pages 786 and 787) are admixed with 14.4 parts of the compound of the abovementioned formula and subjected in accordance with DE No. 2,742,575 (≙U.S. Pat. No. 4,253,839) Example 3 to a vibratory grinding (prepigment) and a solvent conditioning process.

After removal of the solvent, the product is washed with water until neutral and salt-free and dried at 50° C.

138 parts are obtained of a pigment of the formula

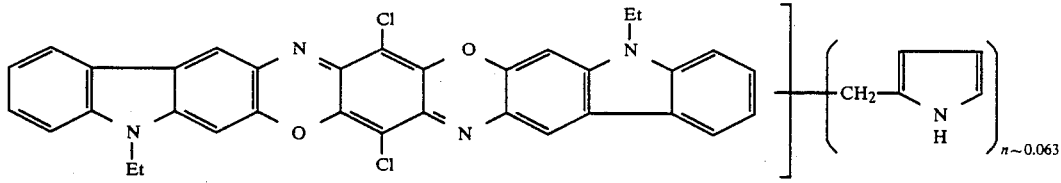

The pigment obtained has a significantly lower rheology in the AM varnish and a lower viscosity than the untreated pigment.

|  | Example 14 | Comparison |
|---|---|---|
| Rheology | 5 | 1 to 2 |
| Viscosity | 4.9 sec | 7.1 sec |

EXAMPLE 15

Example 14 is repeated to react 20 parts of crude C. I. Pigment Violet 23 (salt-free) and 3.5 parts of 2-hydroxymethylthiophene to give 22.3 parts of the pigment derivative of the formula

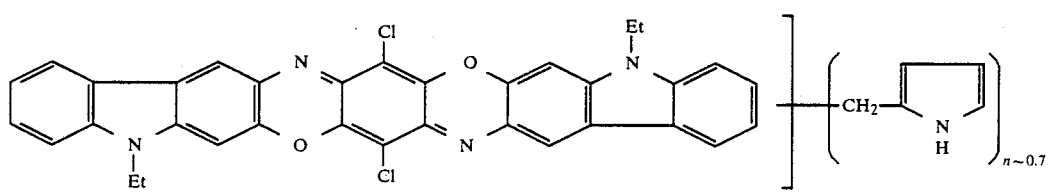

180 parts of crude C. I. Pigment Violet 23 are admixed with 14.4 parts of the compound of the abovementioned formula and treated as described in Example 14.

This gives 138 parts of a pigment of the formula

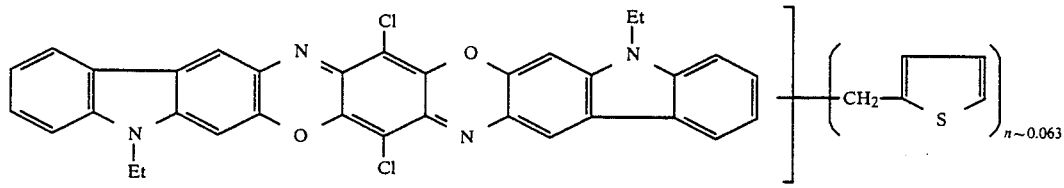

The pigment obtained has a significantly better rheology and lower viscosity than the comparison.

|  | Example 15 | Comparison |
|---|---|---|
| Rheology | 5 | 1 to 2 |
| Viscosity | 2.5 sec | 7.1 sec |

EXAMPLE 16

Example 14 is repeated to react 20 parts of crude C. I. Pigment Violet 23 (salt-free) and 3.9 parts of 2,5-bishydroxymethylfuran to give 23.4 parts of the pigment derivative of the idealized formula

|  | Example 16 | Comparison |
|---|---|---|
| Rheology | 5 | 1 to 2 |
| Viscosity | 4.0 sec | 7.1 sec |

EXAMPLE 17

Example 14 is repeated to react with 60 parts of crude C. I. Pigment Violet 23 (salt-free) in 1,500 parts of polyphosphoric acid and 13.6 parts of 5-hydroxymethyl-4-methylimidazole hydrochloride to give 65 parts of the pigment derivative of the formula (A)

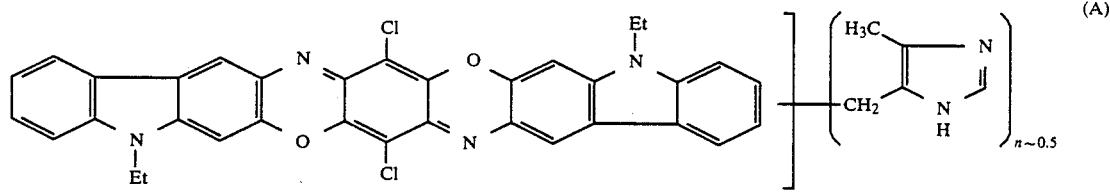

The $^1$H-NMR spectrum of the pigment derivative

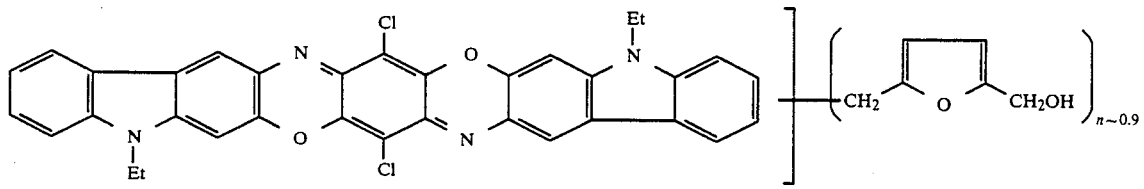

180 parts of crude C. I. Pigment Violet 23 are admixed with 14.4 parts of the compound of the above formula and treated as described in Example 14.

The result obtained is 138 parts of a pigment of the idealized formula shows a degree of derivatization of ~50%. The basis for the calculation was the integral ratio of N—CH$_2$—CH$_3$ : imidazolyl—CH$_3$.

180 parts of crude C. I. Pigment Violet 23 are admixed with 14.4 parts of the compound of the above-

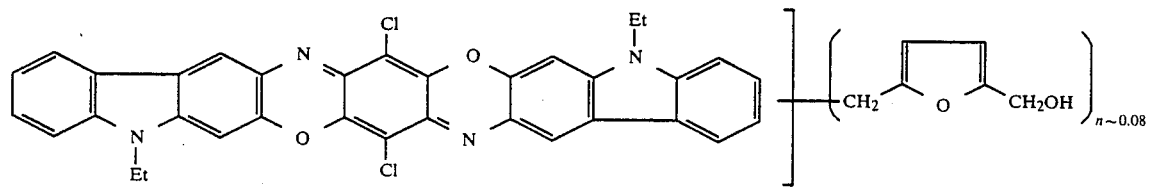

The pigment obtained has significantly better rheology in the AM varnish and a lower viscosity than the comparison.

mentioned formula and treated as described in Example 14 to give 138 parts of a pigment of the formula (B)

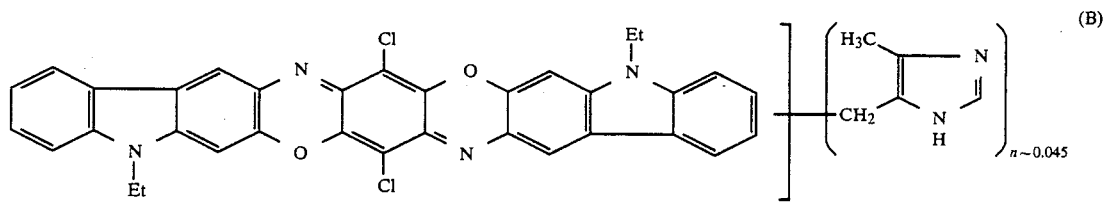

The dioxazine pigment prepared in this way is notable for excellent rheological properties in the AM varnish and TSA-NAD finish. Compared to a pigment prepared under the same conditions without pigment derivative it furthermore has a significantly higher color strength, a high cleanliness of hue, high transparency, good dispersibility, flocculation stability, a low viscosity and an excellent gloss.

|  | Example 17 | | Comparison | |
|---|---|---|---|---|
|  | AM | TSA/NAD | AM | TSA/NAD |
| Rheology | 5 | 5 | 1 to 2 | 2 to 3 |
| Viscosity | 2.9 sec | 4.3 sec | 7.1 sec | 11.6 sec |
| Gloss | 85 | 76 | 36 | 56 |

EXAMPLE 18

160 parts of prepigment Violet 23 are admixed with 12.8 parts of the pigment derivative prepared as described in Example 17 and subjected in accordance with DE No. 2,742,575, Example 3, to a solvent conditioning process to give 135 parts of a pigment which likewise has the advantages recited in Example 17.

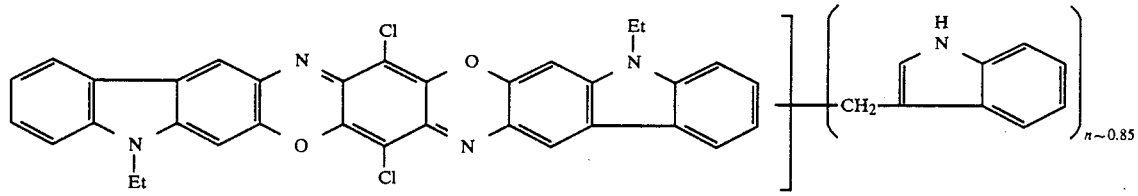

|  | Example 18 | | Comparison | |
|---|---|---|---|---|
|  | AM | TSA/NAD | AM | TSA/NAD |
| Rheology | 5 | 5 | 1 to 2 | 2 to 3 |
| Viscosity | 3.0 sec | 4.6 sec | 7.1 sec | 11.6 sec |
| Gloss | 83 | 74 | 36 | 56 |

EXAMPLE 19

50 parts of C. I. Pigment Violet 23, 51319, are admixed with 5 parts of the pigment derivative prepared as described in Example 17 and mixed mechanically in a mill.

This gives 54.5 parts of a pigment which in the AM varnish and TSA-NAD finish compared with untreated Pigment Violet 23 has the advantages recited in Example 17.

|  | Example 19 | | Comparison | |
|---|---|---|---|---|
|  | AM | TSA/NAD | AM | TSA/NAD |
| Rheology | 5 | 5 | 1 to 2 | 2 to 3 |
| Viscosity | 2.8 sec | 3.4 sec | 7.1 sec | 11.6 sec |
| Gloss | 83 | 74 | 36 | 56 |

EXAMPLE 20

Example 14 is repeated to react 20 parts of crude C. I. Pigment Violet 23 (salt-free) and 4.5 parts of 4-hydroxymethylindole to give 23.8 parts of the pigment derivative of the formula

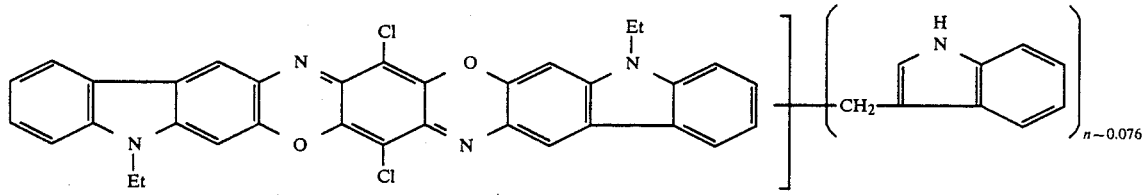

180 parts of crude C. I. Pigment Violet 23 are admixed with 14.4 parts of the compound of the aforementioned formula and treated as described in Example 14 to give 138 parts of a pigment of the formula The pigment obtained has a lower rheology, a lower viscosity and a lower gloss value in the AM varnish compared with untreated C. I. Pigment Violet 23.

|  | Example 20 | Comparison |
|---|---|---|
| Rheology | 5 | 1 to 2 |
| Viscosity | 5.0 sec | 7.1 sec |
| Gloss | 70 | 36 |

EXAMPLE 21

137 parts of presscake of C. I. Pigment Violet 23 corresponding to 50 parts of dry are introduced initially. 312 parts of water and 21 parts of isobutanol are then added, and this mixture is ground for 40 minutes in a stirred ball mill filled with zirconium oxide beads 1 to 1.5 mm in diameter. Thereafter 29 g of a presscake of the derivative of Example 17 (corresponding to 5 parts dry) are added and grinding is continued for a further 20 minutes. The mill base is then sieved off, the zirconium oxide beads are washed with water, and the isobutanol is distilled off at up to 100° C. at the distillation bridge. This is followed by filtering off with suction, washing with water and drying of the pigment at 80° C.

The result obtained is 53.9 g of a pigment of the formula B (Example 17) with n∼0.045, which is notable in nitrocellulose in intaglio printing for its color strength, cleanliness of hue, good dispersibility and low viscosity. In addition, the pigment according to the invention is free of any tendency to flocculate, while the comparison is very prone to flocculating.

In the AM varnish this pigment is rated as follows:

|  | Example 21 | Comparison |
| --- | --- | --- |
| Color strength | very strong | weak |
| Rheology | 5 | 3 to 4 |
| Flocculation | does not flocculate | very prone to flocculation |
| Gloss | 85 | 52 |

In the TSA-NAD finish this pigment is rated as follows:

|  | Example 21 | Comparison |
| --- | --- | --- |
| Color strength | very strong | weak |
| Rheology | 5 | 4 |
| Flocculation | does not flocculate | very prone to flocculation |
| Gloss | 80 | 59 |

We claim:

1. A pigment of the general formula I

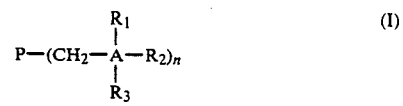

where A is a five- or six-membered aromatic fused or unfused heterocycle which contains one to three hetero atoms selected from the group consisting of nitrogen, oxygen, sulfur and combinations thereof and which is bonded to the methylene group via a carbon atom, $R_1$ and $R_2$ are each hydrogen, alkyl $C_1$-$C_4$, alkylene $C_2$ or aryl, and together $R_1$ and $R_2$ may also be an aliphatic or aromatic ring, $R_3$ is hydrogen, alkyl $C_1$-$C_4$, hydroxyalkyl $C_1$-$C_3$, or alkylene $C_2$ with alkyl being linear or branched, P is the radical of a polycyclic pigment, or a radical of a mix-crystal of polycyclic pigments and n is a number from 0.001 to 0.2.

2. A pigment of the formula (I) as set forth in claim 1, wherein P is an anthraquinone, anthrapyrimidine, anthanthrone, quinacridone, quinophthalone, diketopyrrolopyrrole, dioxazine, flavanthrone, indanthrone, isoindoline, isoindolinone, isoviolanthrone, perinone, perylene, phthalocyanine, pyranthrone or thioindigo radical or is the radical of a mix-crystal of the aforementioned polycyclic pigments.

3. A pigment of the formula (I) as set forth in claim 1, wherein A is the radical of a five-membered aromatic heterocycle from the series consisting of furan, thiophene, pyrrole, pyrazole, thiazoles, oxazoles, triazoles and imidazole.

4. A pigment of the formula (I) as set forth in claim 1, wherein A is the radical of a fused heterocycle from the series thionaphthene, benzoxazole, benzothiazole, benzimidazole, benzotriazole and indole.

5. A pigment of the formula (I) as set forth in claim 1, wherein n is 0.01 to 0.1.

* * * * *